United States Patent [19]

Buonavita

[11] 4,032,830
[45] June 28, 1977

[54] MODULAR CONSTANT CURRENT POWER SUPPLY

[75] Inventor: Carlos Ernesto Buonavita, South Pasadena, Calif.

[73] Assignee: Burroughs Corporation, Detroit, Mich.

[22] Filed: July 3, 1975

[21] Appl. No.: 593,070

[52] U.S. Cl. .................................. 363/25; 363/71
[51] Int. Cl.² ..................................... H02M 3/335
[58] Field of Search ............. 321/2, 18, 4, 19, 27 R

[56] References Cited

UNITED STATES PATENTS

| | | | |
|---|---|---|---|
| 3,624,405 | 11/1971 | Bishop et al. | 321/2 X |
| 3,670,234 | 6/1972 | Joyce | 321/18 |
| 3,737,758 | 6/1973 | Allington | 321/18 |
| 3,742,330 | 6/1973 | Hodges et al. | 321/4 |
| 3,859,583 | 1/1975 | Reed | 321/2 |
| 3,859,586 | 1/1975 | Wadlington | 321/18 |
| 3,898,549 | 8/1975 | Mitchell | 321/2 |
| 3,916,282 | 10/1975 | Rothermel | 321/2 |
| 3,927,363 | 12/1975 | Mitchell et al. | 321/18 |
| 3,938,024 | 2/1976 | Clarke | 321/18 |
| 3,947,747 | 3/1976 | Smith | 321/18 |

*Primary Examiner*—Gerald Goldberg
*Attorney, Agent, or Firm*—Alfred W. Kozak; Nathan Cass; Kevin R. Peterson

[57] ABSTRACT

A power supply employing a clock-driven D.C.-A.C.-D.C. converter having a current transformer in the A.C. section to develop a trapezoidal current feedback pulse train which is then converted to a trapezoidal voltage pulse train. A comparator compares the trapezoidal voltage pulse train to a voltage reference level set such that it is normally crossed by the ramp portion of each trapezoidal voltage pulse. Upon occurrence of a ramp crossing, which varies with the level of the output current, a control pulse is produced by the comparator and supplied to gating logic which develops driving pulse trains for the D.C.-A.C.-D.C. converter and cuts off each driving pulse upon occurrence of a control pulse. The resulting power supply constitutes a voltage-controlled constant current power supply which may be connected with an arbitrary number of other such supplies to a power bus and to a common feedback-controlled voltage reference source.

15 Claims, 5 Drawing Figures

MODULAR CONSTANT CURRENT POWER SUPPLY

BACKGROUND OF THE INVENTION

This invention relates to power supplies employing D.C.-A.C.-D.C. conversion and more specifically to such power supplies capable of being connected in variable numbers to a power bus for meeting various output power requirements.

Circuitry for accomplishing D.C.-A.C.-D.C. power conversion is well-known in the art. Such circuits generally employ switching means such as power transistors or SCR's set up to modulate an unregulated D.C. supply level. The modulation is accomplished by either clock-driving the power switching means or configuring the power switching means in self-oscillating circuits. It is also generally known to provide feedback of the output voltage of such circuits to control either the frequency or duration of the excitation of the converter switching elements. Such use of feedback is illustrated in the converter circuits of U.S. Pat. No. 3,824,441 issued to Heyman et al. on July 16, 1974 and U.S. Pat. No. 3,670,234 issued to Joyce on June 13, 1972.

However, none of these prior art circuits have exhibited sufficient responsiveness to changing output load conditions to enable them to be practically used in multiple configurations to provide varying amounts of power required by diverse loads. Particularly in the area of computer systems where diverse system size and power requirements exist, the flexibility attainable from a modular power supply has appeared to be of immeasurable value, especially in eliminating excessive costs required to adapt power supplies to various load requirements.

SUMMARY OF THE INVENTION

Hence, it is an object of the invention to provide a new and improved power supply.

It is another object of the invention to provide a power supply employing D.C.-A.C.-D.C. conversion and connectable in arbitrary numbers to supply arbitrary load power requirements.

It is yet another object of the invention to provide an improved feedback regulation scheme for D.C.-A.C.-D.C. power supplies which is not dependent on the prior technique of monitoring output voltage.

These and other objects of the invention are accomplished by monitoring the ramp characteristic of current pulses outputted by the power switching means of a D.C.-A.C.-D.C. converter and developing a feedback ramp voltage waveform proportional to those current pulses. A control pulse is developed each time the ramp voltage waveform exceeds a reference level, which is set such that a control pulse is normally produced during each activation period of a power switching means. The control pulses and a clock signal are fed to gating logic which supplies the power switching means with a train of drive pulses, each of which is terminated by the occurrence of a control pulse. Since a variation in output current level results in variation in the time of occurrence of a control pulse, the duration of the drive pulses supplied to the power switching means also varies in response to a deviation in output current level, resulting in current regulation. Furthermore, variation in the reference voltage level results in control of the output voltage, resulting in an additional degree of control over the output power.

BRIEF DESCRIPTION OF THE DRAWINGS

A particular manner of implementing the just summarized invention and further advantages obtainable by such implementation will now be detailed in the following description of the preferred embodiment of the invention, read in conjunction with the drawings of which:

FIG. 5 illustrates a configuration of a number of modular power supplies of the invention on a single power bus.

DETAILED DESCRIPTION OF THE PREFERRED EMBODIMENT

Figure 1:
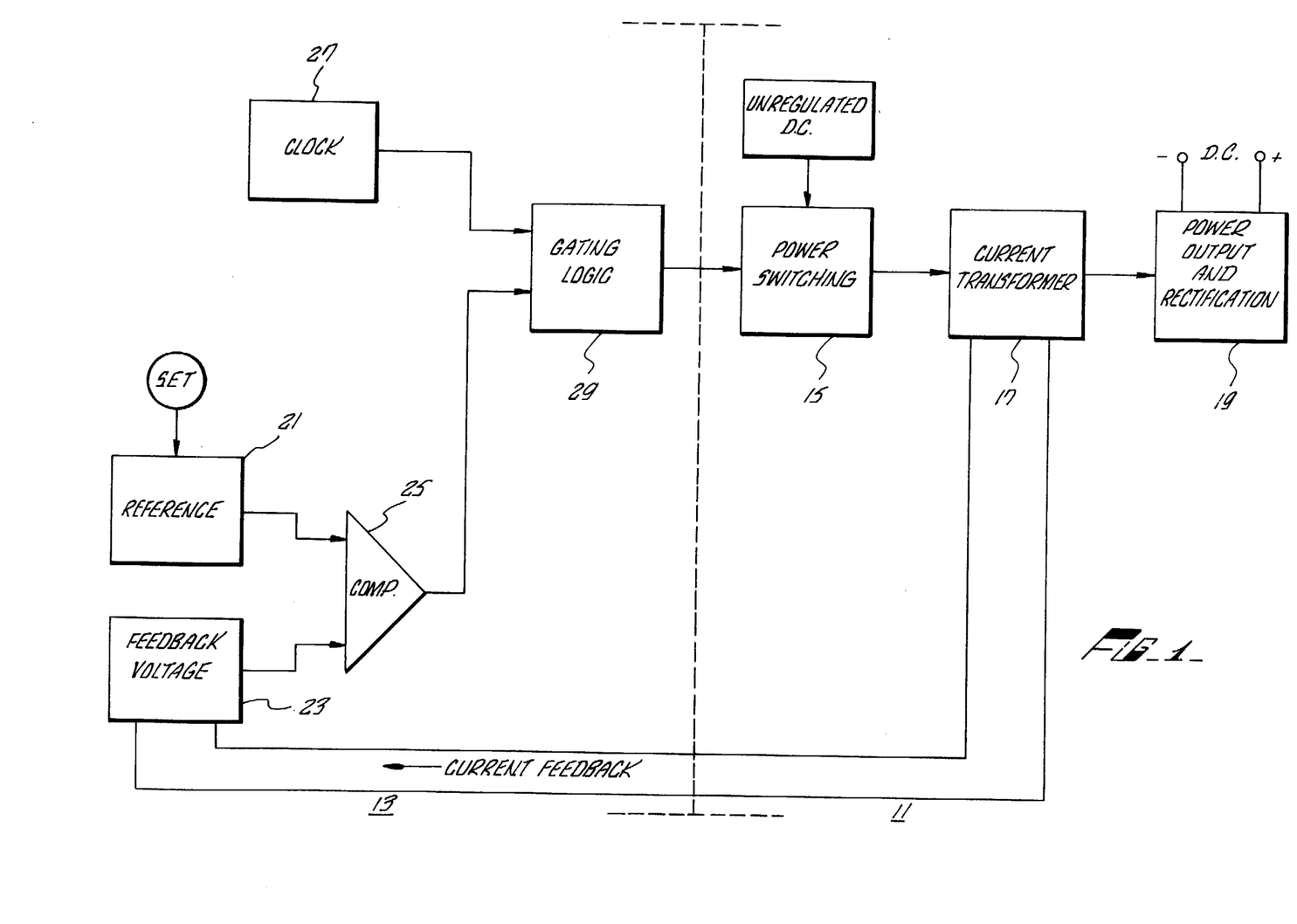
FIG. 1 is a block diagram illustrating the preferred embodiment of the invention in generalized form.

The power supply of the preferred embodiment of the invention may be thought of as comprising two units, a power converter unit 11 and a control unit 13 for controlling the power converter 11 in response to feedback information. The power converter 11 of FIG. 1 includes a power output and rectification section 19, a power switching transistor section 15 and a current transformer 17. The control unit 13 controls the switching transistor section 15 in accordance with control information provided by feedback from the current transformer 17. The information is developed by a feedback voltage unit 23 which develops a voltage for comparison to a voltage reference 21 by a comparator 25. Clock gating and logic circuitry 29 controls a clock signal from a clock 27 in accordance with the output of the comparator 25 to properly trigger the power switching circuitry 15.

Figure 2:
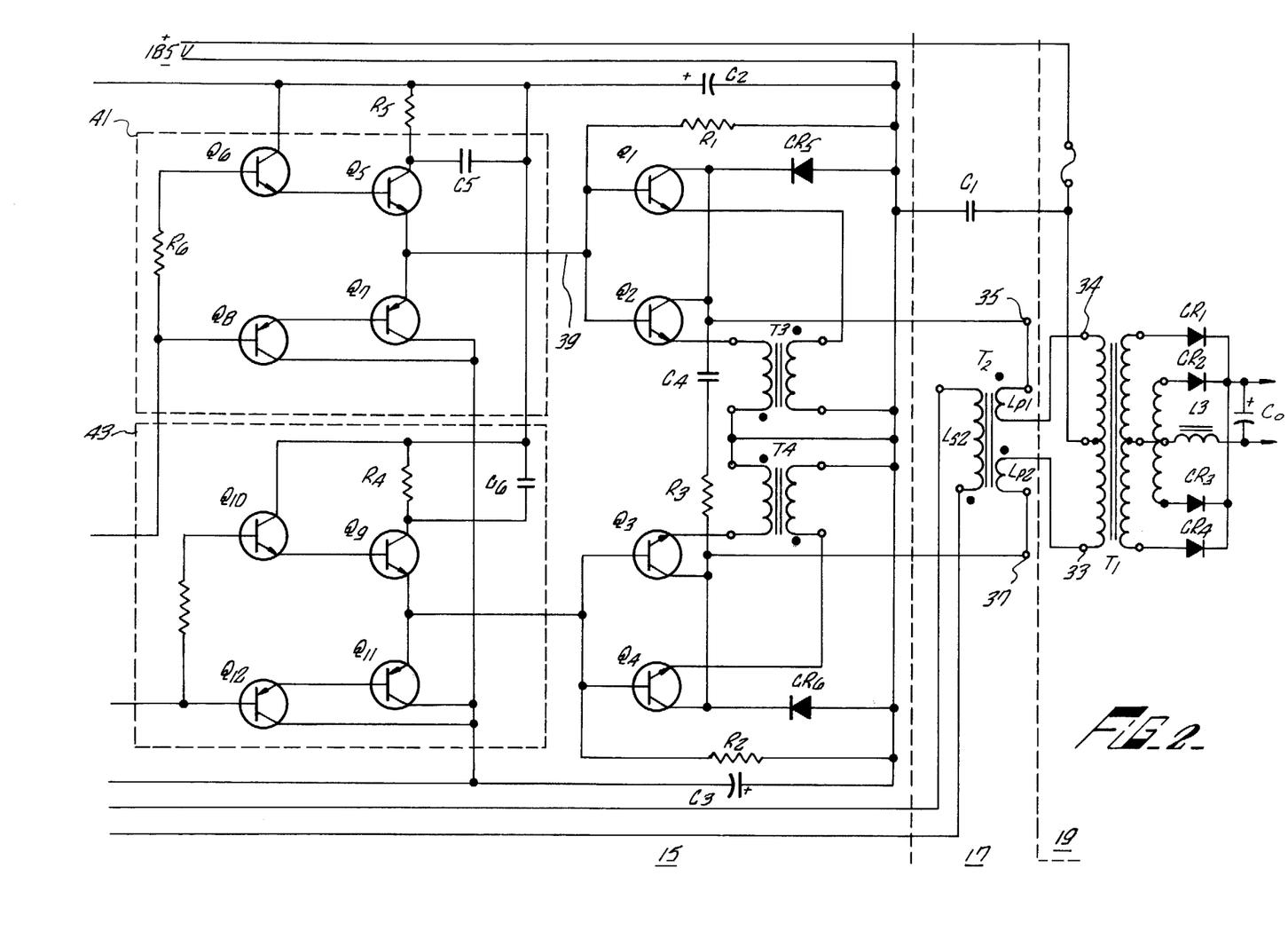
FIG. 2 is a circuit diagram illustrating the power switching circuitry and output section of the preferred embodiment of the invention.

The power output and rectification circuitry 19 shown in FIG. 2 includes a power transformer $T_1$ having a center tap on both the primary and secondary windings. Coupled to the secondary of the power transformer $T_1$ is a full wave rectifier including four diodes $CR_1$, $CR_2$, $CR_3$, $CR_4$. The anodes of the diodes $CR_1$, $CR_2$, $CR_3$ and $CR_4$ are connected to the secondary winding of the transformer $T_1$, and the cathodes of each of the diodes $CR_1$, $CR_2$, $CR_3$, $CR_4$ are connected together into one terminal of a capacitor $C_0$. The other terminal of the capacitor $C_0$ is connected to a choke input coil $L_3$, which also connects to the secondary of the transformer $T_1$. The diodes $CR_1$, $CR_2$, $CR_3$, $CR_4$, coil $L_3$ and capacitor $C_0$ serve to convert the waveform present at the secondary of the transformer $T_1$ into a D.C. voltage across the capacitor $C_0$.

One off-center terminal 34 of the primary of the power transformer $T_1$ is connected to the first primary coil $L_{p1}$ of a current transformer $T_2$. The other off-center tap 33 of the primary of the transformer $T_1$ is connected to the secondary primary coil $L_{p2}$ of the current transformer $T_2$. The second terminal 35 of the first primary coil $L_{p1}$ of the current transformer $T_2$ is connected to the collector of two power switching transistors $Q_1$, $Q_2$, and the other terminal 37 of the second primary coil $L_{p2}$ of the current transformer $T_2$ is connected to the collectors of two power transistors $Q_3$, $Q_4$.

The secondary $L_{s2}$ of the current transformer $T_2$ supplies a feedback signal to the control circuitry 13. As a result of these connections, when unregulated D.C. voltage is supplied to the center tap of the primary of the transformer $T_1$, it is also supplied to the collectors of each of the power switching transistors $Q_1$, $Q_2$, $Q_3$, $Q_4$.

In discussing the operation of these power switching transistors $Q_1$, $Q_2$, $Q_3$, $Q_4$, it is helpful to consider the interconnection of one pair of transistors $Q_1$, $Q_2$. As before noted, the collectors of each of these transistors $Q_1$, $Q_2$ are connected to the first primary coil $L_{p1}$ of the current transformer $T_2$. Both collectors are also connected to the unregulated voltage return line via a diode $CR_5$, which is a voltage spike suppressor not absolutely essential for circuit operation. The base of each of the power transistors $Q_1$, $Q_2$ is connected to one output terminal 39 of a section 41 of the power transistor driver circuitry. The emitter of the transistor $Q_1$ is connected to the first terminal of one side of a current equalizing transformer $T_3$, while the emitter of the second power switching transistor $Q_2$ is connected to the first terminal of the opposite side of the current equalizing transformer $T_3$. The second terminals of the two sides of the current equalizing transformer $T_3$ are connected together to the return or common of the 185V source.

When a square current pulse is received at the bases of the power transistors $Q_1$, $Q_2$ from the driver circuitry section 41, these transistors $Q_1$, $Q_2$ are turned on. A trapezoidal waveform (FIG. 4A) is then developed at the collectors of these transistors $Q_1$, $Q_2$, and is transmitted via the secondary of the current transformer $T_2$ to the control circuitry 13. The current equalizing transformer $T_3$ then serves to equalize the current output of the power transistors $Q_1$, $Q_2$. While two power transistors such as $Q_1$, $Q_2$ are used in the preferred embodiment, an operative circuit could easily be configured with one or more such power transistors.

As may be apparent, the second pair of power switching transistors $Q_3$ and $Q_4$ are configured analogously to the transistors $Q_1$, $Q_2$. Additionally, a resistor $R_3$ and a capacitor $C_4$ are provided connecting the junction of the collectors of the first pair of power switching transistors $Q_1$ and $Q_2$ and the first primary coil $L_{p1}$ of the current transformer $T_2$ to the junction point of the collectors of transistors $Q_3$, $Q_4$ and the terminal 37 of the second primary coil $L_{p2}$ of the current transformer $T_2$. These two elements $R_3$, $C_4$ provide spike suppression and are again not absolutely essential to circuit operation.

The driver circuitry includes two separate driver units 41, 43, one for each pair of power switching transistors $Q_1$, $Q_2$ and $Q_3$, $Q_4$. The first driver unit comprises 4 driver transistors $Q_5$, $Q_6$, $Q_7$, $Q_8$. The collectors of the actuating transistors $Q_5$, $Q_6$ are connected to a positive D.C. bias source, which is isolated from the unregulated D.C. source common by a capacitor $C_2$. The collectors of the turn-off transistors $Q_8$, $Q_7$ are connected to an auxiliary voltage source, which is connected to the unregulated D.C. source common via a capacitor $C_3$. The base of the actuating transistor $Q_6$ is connected via a resistor $R_6$ to the base of a transistor $Q_8$, which is in turn connected to the output of a NOR gate 45, part of the control circuitry 13 illustrated in FIG. 3. A "high" or "true" output from this NOR gate 45 turns on the actuating transistors $Q_6$, $Q_5$, and provides a trigger pulse to the bases of the power transistors $Q_1$, $Q_2$. A "low" or "false" level from the NOR gate 45 activates the turn-off transistors $Q_7$, $Q_8$, pulling current out of the base of the power transistors $Q_1$, $Q_2$. The second set of driver transistors $Q_9$, $Q_{10}$, $Q_{11}$, $Q_{12}$ are analagously biased and connected to be triggered by an output from a NOR gate 47 of the control circuitry of FIG. 3 and to drive the bases of the second pair of power switching transistors $Q_3$, $Q_4$. The manner of triggering outputs from the NOR gates 45, 47 will now be described with reference to FIG. 3 and FIG. 4.

Figure 3:
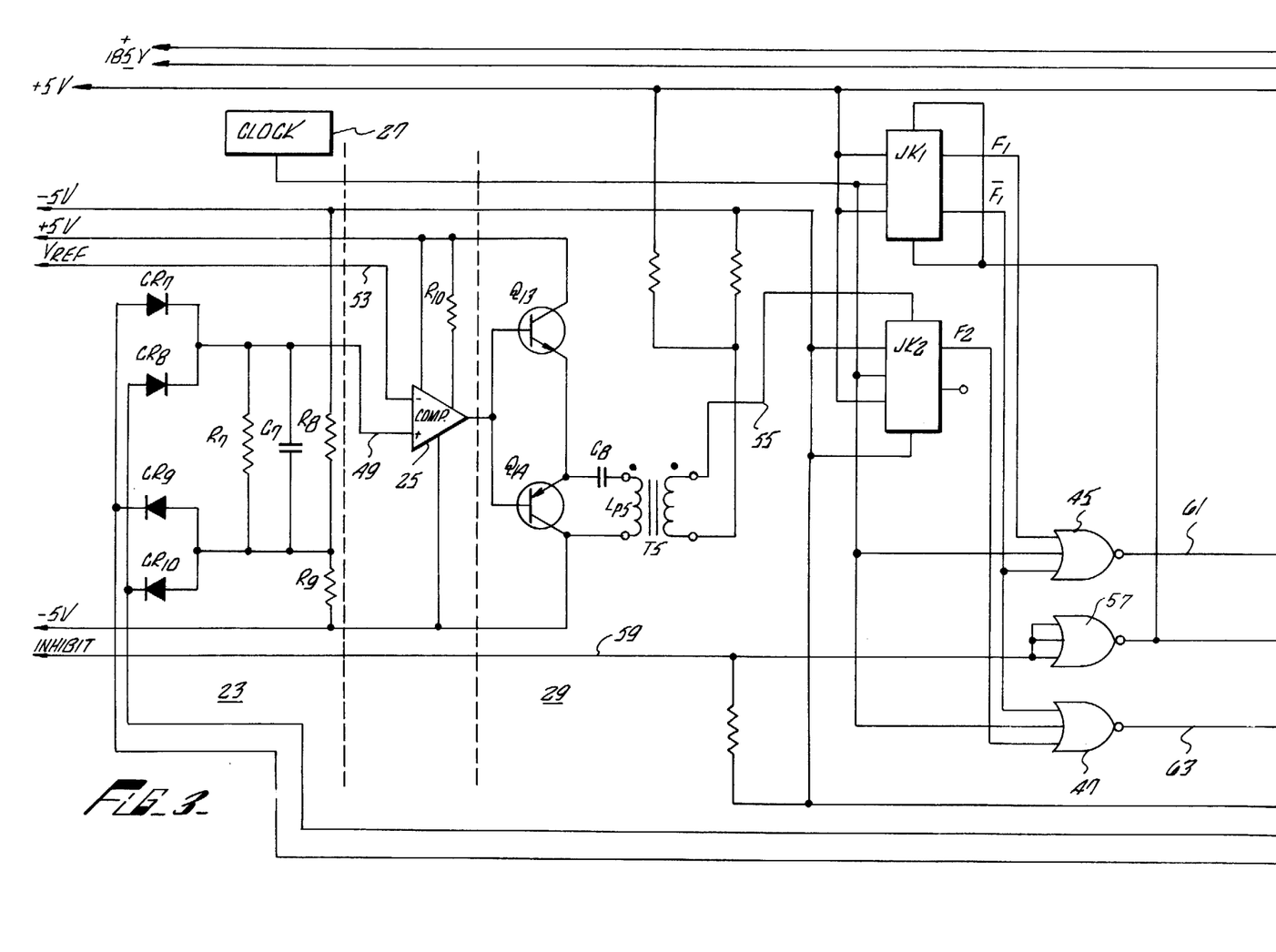
FIG. 3 is a circuit diagram of the power switching control circuitry of the preferred embodiment of the invention.
Figure 4A:
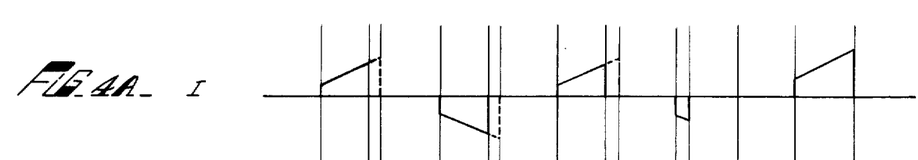
FIG. 4 illustrates waveforms at various points in the preferred embodiment of the invention.

As before noted, the alternating current trapezoidal waveform produced in the primary of the current transformer $T_2$ and illustrated in FIG. 4A is fed back via the secondary of the transformer $T_2$ to the control circuitry of FIG. 3. This signal is full wave rectified by diodes $CR_7$, $CR_8$, $CR_9$, $CR_{10}$ of the control circuitry. The resulting rectified trapezoidal current waveform is converted to a voltage waveform (FIG. 4E) by a resistor $R_7$, which may be connected to a parallel capacitor $C_7$ for noise suppression. The trapezoidal waveform developed across the resistor $R_7$ is then applied via a resistive divider network $R_8$, $R_9$ to the positive input 49 of the comparator 25, whose negative input 53 is supplied by a reference voltage $V_{ref}$. The trapezoidal signal thus presented to the positive input 49 of the comparator 25 is representative of the current level passing through the primary of the power transformer $T_1$ and hence the output current. Additionally, its duration is representative of the duration of the trapezoidal current pulses in the primary of the power transformer $T_1$.

During any interval in which a trapezoidal pulse exceeds the reference voltage $V_{ref}$, the comparator 25 turns on two transistors $Q_{13}$, $Q_{14}$. The first npn driver transistor $Q_{13}$ has its emitter connected to the emitter of the second pnp driver transistor $Q_{14}$. One terminal of a capacitor $C_8$ is connected to the commonly connected emitters of the driver transistors $Q_{13}$, $Q_{14}$. The second terminal of the capacitor $C_8$ is connected to the first terminal of a primary coil $L_{p5}$, whose second terminal is connected in common with the collector of the transistor $Q_{14}$ to a negative source voltage. When the comparator provides the respective bases of the two transistors $Q_{14}$, $Q_{13}$ with a turn-on signal, current passes through the primary coil $L_{p5}$ of the transformer $T_5$. Hence a signal is applied to the preset terminal 55 of a JK flip-flop $JK_2$. The transformer $T_5$ performs an isolating function, in effect isolating all of the control circuitry from the power circuitry.

Figure 4B:
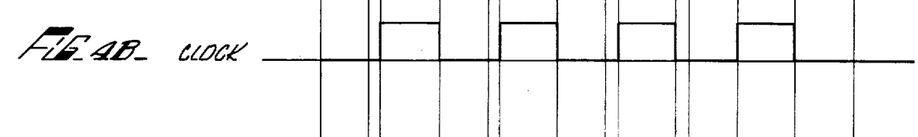

The control flip-flop $JK_2$ cooperates with a clocking flip-flop $JK_1$ to drive the NOR gates 45, 47, which trigger the driver circuitry 41, 43 of FIG. 2. The clocking flip-flop $JK_1$ has its J and K inputs both connected to the positive voltage source and has its clock input supplied with clock pulses such as shown in FIG. 4B. Its preset and clear inputs are connected to the output of a NOR gate 57, which receives an input from an inhibit line 59. One output $F_1$ of the flip-flop $JK_1$ is supplied as an input to the first driving NOR gate 45 and the other output $\bar{F}_1$ is supplied as an input to the second driving NOR gate 47. Each of these driving NOR gates 45, 47 receives a second input from the system clock signal and a third input from the output $F_2$ of the control flip-flop $JK_2$. The J input of the control flip-flop $JK_2$ is connected to the negative voltage bias source $V_1$ as is the clear input. The K input of the control flip-flop $JK_2$ is connected to the positive bias source.

Figure 4C:
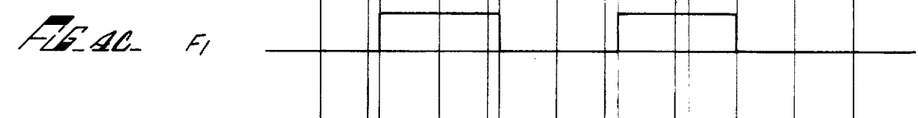
Figures 4D, 4E:
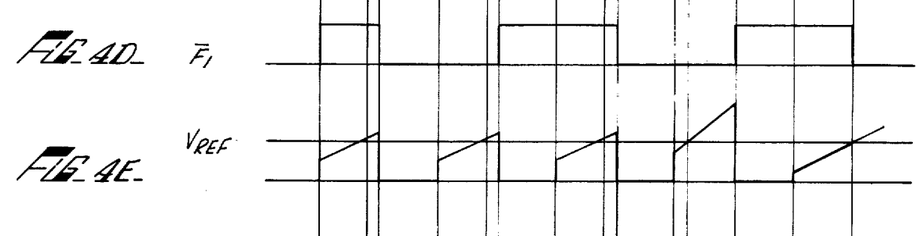
Figure 4F:
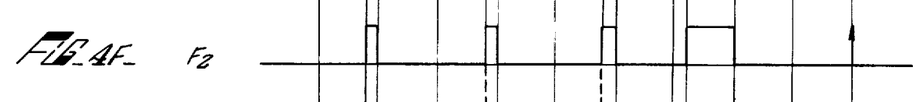
Figure 4G:
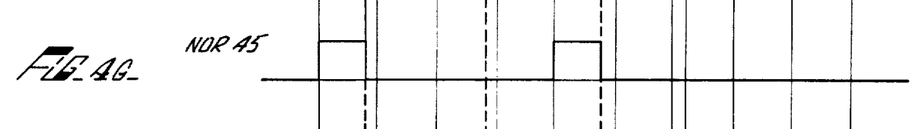
Figure 4H:
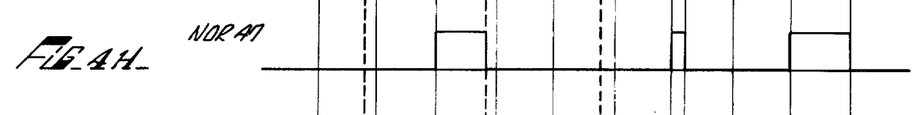

The operation of the control circuitry is as follows. Because of its biasing, the clocking flip-flop $JK_1$ changes state in response to each clock pulse. The signals at the outputs $F_1$, $\overline{F_1}$ of the flip-flop $JK_1$ in relation to the clock signals are shown in FIGS. 4C and 4D. The reference level supplied to the comparator 25 is adjusted as shown in FIG. 4E such that at the desired output level the trapezoidal pulses supplied to the comparator 25 slightly exceed the reference level. Hence, the flip-flop $JK_2$ is set by each trapezoidal pulse and is reset by the next clock pulse. Its output $F_2$ is shown in FIG. 4F. The resulant outputs 61, 63 of the driver NOR gates 45, 47 are equal logically to $F_1$ + clock + $F_2$ and $\overline{F_1}$ + clock + $F_2$. These outputs are illustrated in FIGS. 4G and 4H respectively.

Thus, the duration of activation of the driver transistors $Q_5$, $Q_6$, $Q_9$, $Q_{10}$ is determined by where in time each trapezoidal pulse exceeds the reference level, triggering flip-flop $JK_2$. If an overcurrent condition develops, $JK_2$ will be triggered earlier, reducing the duration of driver activation and hence output current. Likewise, an undercurrent condition results in later activation of the flip-flop $JK_2$ and a longer duration of activation of the corresponding driver transistors. Overall, this operation results in a constant current output.

Figure 4I:
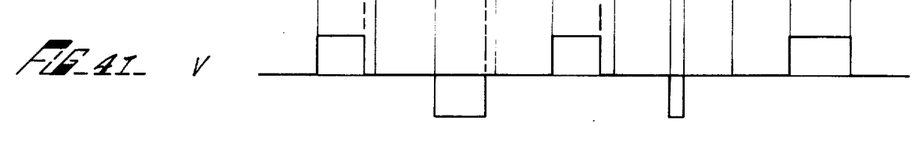
Figure 6:
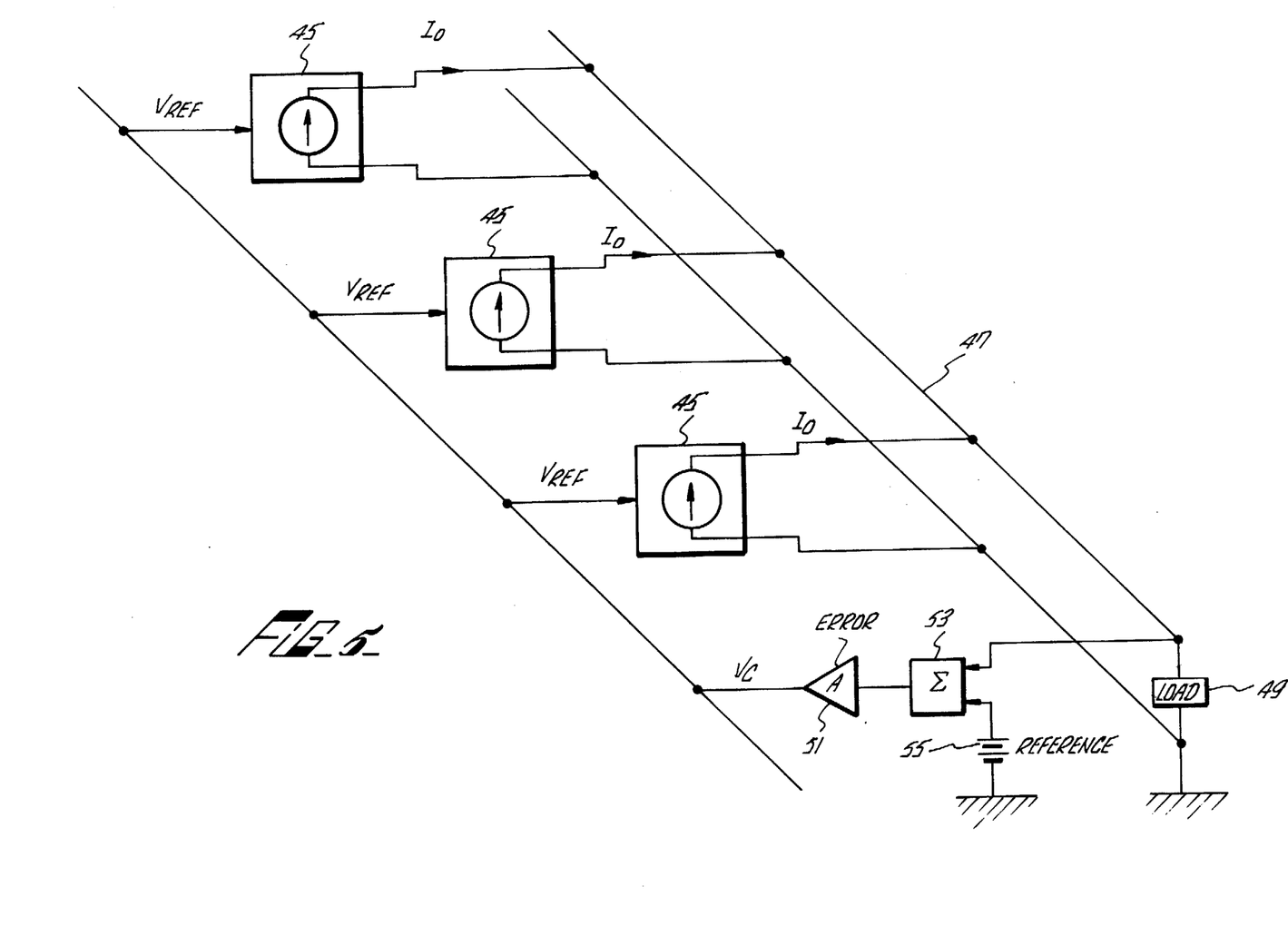

Additionally, voltage regulation is achieved by the circuit of the preferred embodiment. For example, the collector voltage of one of the power transistors $Q_1$ is shown in FIG. 4I. Since the duration of this collector voltage is determined by the same $JK_2$ trigger points discussed above, the output voltage resulting from the integrating effect of the power output circuitry 19 is held at a constant level.

Since the output current is held constant by the functioning of the control circuitry 13 in the preferred embodiment of the invention, the power converter of the preferred embodiment is essentially a constant current source. Great flexibility arises from this fact because, as shown in FIG. 5, any number of such current sources can be paralleled to provide any desired amount of power. This fact is of great significance because widely varying amounts of power are required by the diverse data processing systems now in use.

As is apparent, the reference voltage $V_{ref}$ may be varied in order to vary the current output of the power supply. The average voltage level will also vary accordingly. As shown in FIG. 5 a common reference voltage Vc may be used in all of a number of modules connected to a power bus 47. Such modules 45 are represented essentially as voltage controlled current sources. Where the reference voltage Vc is an error signal derived by comparing the voltage supplied to a load 49 against a second reference voltage, the entire system will be voltage regulated. Such an error signal may be derived, as well-known in the art, by an error amplifier 51, a summer 53 and a suitable reference source 55. An unlimited number of blocks 45 constructed according to the invention may be connected to a power bus.

Two other desirable features inhere in the power converter circuitry described above. First, the switching transistors pairs are forced to have the same current output, i.e., the circuit is balanced to prevent power transformer saturation. Second, the inputs to the flip-flops $JK_1$ and $JK_2$ are isolated from the comparator circuit by a pulse transformer $T_5$. In effect, all of the logic and gating circuitry is thereby isolated from the power circuitry.

In addition to those modifications described above, many others may be made in the preferred embodiment of the invention without departing from the scope and spirit thereof. Therefore, it is to be understood that, within the scope of the appended claims, the invention may be practiced other than as specifically described.

What is claimed is:

1. A power supply for converting an unregulated D.C. voltage level to a desired constant current output comprising:
   transforming means having input means for converting an A.C. signal supplied to said input means to a D.C. level;
   power switching means for modulating said unregulated D.C. voltage level to produce an A.C. current waveform exhibiting successive ramps and connected to supply said A.C. current waveform to said input means of said transforming means;
   means for developing a control voltage waveform comprising successive ramps proportional to those of said A.C. current waveform;
   means for producing a reference voltage level and for setting said level such that each said control voltage ramp proportional to said A.C. current waveform normally crosses said reference level when said desired current output is produced; and
   means for actuating said power switching means only for those intervals during which a said control voltage ramp does not exceed said reference level to control said A.C. current waveform such that a deviation from said desired constant current output level is corrected.

2. The power supply of claim 1 wherein said A.C. current waveform and said control voltage waveform comprise trapezoidal pulse trains.

3. The power supply of claim 1 wherein said power switching means includes first and second power switching elements and wherein said means for actuating said power switching means comprises:
   means for comparing said control voltage waveform to said reference voltage level and developing a control pulse each time a said control voltage ramp exceeds said reference level; and
   means for actuating said first power switching element for a period bounded by the beginning of a first control voltage ramp and production of a first said control pulse and said second power switching element for a period bounded by the beginning of a second control voltage ramp and production of a second control pulse.

4. The power supply of claim 1 wherein said control voltage waveform developing means includes:
   a current transformer means having a primary circuit means for transmitting said A.C. current waveform from said power switching means to said transforming means and a secondary circuit means for developing a current feedback signal proportional to said A.C. current waveform.

5. The power supply of claim 1 wherein said transforming means comprises:
   a power transformer having first, second and third secondary output terminals and first, second and third primary input terminals, said secondary primary input terminal being connected to said unregulated D.C. level;
   a choke coil having first and second terminals, said first terminal of said choke coil connected to said first secondary output terminal;
   capacitor means having first and second terminals, said first terminal of said capacitor means connected to the second terminal of said choke coil;

a first rectifier means connected between said second secondary output terminal and the second terminal of said capacitor means; and a second rectifier means connected to said third secondary output terminal and to the connection point of said first rectifier means and said capacitor means.

6. The power supply of claim 5 wherein said control voltage waveform developing means includes:

a current transformer having first and second primary output terminals connected respectively to the first and third primary input terminals of said power transformer, said current transformer further having first and second primary input terminals and first and second secondary terminals.

7. The power supply of claim 6 wherein said A.C. current waveform comprises periodic alternating trapezoidal pulses and said power switching means comprises:

a first electronic switch having a first power control electrode, a first electrode connected to said first primary input terminal of said current transformer and a second electrode connected to a common point; and a second electronic switch having a second power control electrode, a first electrode connected to said second primary input terminal of said current transformer, and a second electrode connected to a common point.

8. The power supply of claim 7 wherein said power switching means further includes:

a first driver switching means having a first driver control electrode for actuating said first power control electrode; and a second driver switching means having a second driver control electrode for actuating said second power control electrode.

9. The power supply of claim 7 wherein said control voltage developing means further includes:

rectification means for producing a rectified trapezoidal pulse train from the output appearing across said first and second secondary terminals of said current transformer means; and means for producing a control voltage signal comprising trapezoidal pulses proportional in magnitude to said rectified trapezoidal pulse train.

10. The power supply of claim 9 wherein said means for actuating said power switching means comprises:

means for comparing said trapezoidal pulses to said reference level and developing a control pulse each time a said trapezoidal pulse exceeds said reference level;

means for producing a first rectangular pulse train for driving said first power control electrode and a second rectangular pulse train identical to said first rectangular pulse train and 180° out of phase therewith for driving said second power control electrode, thereby resulting in production of a said trapezoidal control voltage pulse in synchronization with each pulse of both said first and second rectangular pulse trains; and means for terminating each said first and second rectangular pulse for the duration succeeding production of a corresponding control pulse by said comparing means.

11. The power supply of claim 10 wherein said first and second rectangular pulse producing means comprises:

a clock signal source;

a first flip-flop means driven by said clock and having a first output terminal and a second output terminal whose output is the inverse of said first output terminal;

a first NOR gate receiving an input of said clock signal and of the said first output terminal of said first flip-flop and having output means for driving said first power control electrode; and a second NOR gate receiving an input of said clock signal and of the said second output terminal of said first flip-flop and having output means for driving said second power control electrode.

12. The power supply of claim 11 wherein said rectangular pulse terminating means comprises:

a second flip-flop means for producing a control level in response to a said control pulse and removing said control level in response to the next said clock signal occurring after said control pulse; and means for supplying said control level as a third input to both said first NOR gate and said second NOR gate.

13. In a constant current D.C. power source supplied by an unregulated D.C. power level and having current switching devices and transformers for converting the unregulated D.C. level to an A.C. signal which is then converted to a constant current D.C. output level to a load, the improvement comprising:

a. means for developing fixed frequency clock pulses;
b. logic means for controlling said clock pulses to cause said switching devices to have a controlled duration of a switch-on pulse;
c. means for generating a control signal derived from comparison of a settable voltage reference signal against a voltage feedback signal derived from a current feedback line from said A.C. signal, said control signal being used to determine the duration of said switch-on pulse;
d. means for sensing said A.C. signal and feeding back a current which is converted to a proportional voltage usable to compare to said reference voltage;
e. isolation means for separating said current switching devices from said A.C. signal sensing means, from said control signal generating means and from said logic means.

14. A constant current D.C. power source comprising:

a. converter means including a power transformer and current switching means for converting an unregulated D.C. input level into a balanced A.C. current signal within said power transformer;
b. generation means for providing clock signals to drive said power switching means;
c. logic means to regulate the duration of said clock signals;
d. means for supplying a ramp voltage signal, said ramp voltage signal being derived from the balanced A.C. current developed in said transformer by said power switching means, said ramp signal being a voltage representation of the current existing in the windings of the said power transformer of said converter;
e. a settable reference voltage;
f. a trigger pulse output means to generate a shut-off pulse alternately to individual ones of said switching means, said trigger pulse being initiated at any time when said ramp voltage signal becomes equal to said reference voltage.

15. A constant current D.C. power source for supplying a constant current to loads of varying values comprising:
   a. a first switching transistor having base, emitter, and collector terminals;
   b. a second switching transistor having base, emitter and collector terminals;
   c. a power output transformer having current through its primary winding supplied from an unregulated D.C. supply through the alternative switch-on of said first and second switching transistors, and having a secondary winding;
   d. a current transformer having a pair of primary windings in series with the primary windings of said power transformer, and said current transformer having a secondary winding to provide A.C. current feedback along a feedback line;
   e. a first rectification circuit means connected to the said secondary winding of said power output transformer for rectifying said current output;
   f. second rectification circuit means connected to the secondary coil of said current transformer and to the said feedback line for rectifying the output of said current transformer to produce a rectified control signal;
   g. resistor means connected to said second rectification circuit means for developing a control voltage from said rectified control signal and said current feedback line;
   h. a settable reference level voltage set such that it is normally exceeded by said control voltage at some point in the existence of said control voltage cycle;
   i. comparator means for comparing said reference level voltage and said control voltage from said resistor means, such that said comparator means will produce an output trigger pulse upon the voltage equality of the compared voltages;
   j. isolating transformer means to isolate said transistor switching means from the feedback control means, from the output rectification means and from the control voltage and the trigger pulse means;
   k. a clock pulse generator;
   l. a first flip-flop means toggled by said clock pulse generator for producing first and second pulse trains of alternate phase and polarity;
   m. second flip-flop means connected to said clock generator and said trigger pulse from said comparator for producing a modulation control signal in synchronization with said first and second pulse trains;
   n. a first NOR gate receiving its inputs from said first pulse train, from said clock signal and from said modulation control signal, said first gate having an output;
   o. a second NOR gate for receiving the second pulse train and for receiving said clock signal and said modulation control signal, said second gate having an output;
   p. means for activating the base terminal of said first switching transistor by means of the output of said first NOR gate; and
   q. means for activating the base terminal of said second switching transistor from the output of said second NOR gate.

* * * * *